Patented Aug. 15, 1950

2,518,940

UNITED STATES PATENT OFFICE 2,518,940

PRODUCTION OF GLYCOL DIESTERS OF AROMATIC ACIDS

Frederick F. Rust and William E. Vaughan, Berkeley, and Frank H. Seubold, Los Angeles, Calif., assignors to Shell Development Company, San Francisco, Calif., a corporation of Delaware No Drawing. Application November 19, 1946, Serial No. 710,950

8 Claims. (Cl. 260—469)

This invention relates to a novel process for manufacturing glycol diesters. More particularly, the invention relates to a novel reaction whereby four molecules of certain aldehydes react to form a symmetric diester.

It has been known in the past that aldehydes having no alpha hydrogen atoms undergo a reaction in the presence of strong caustic whereby one molecule of the aldehyde is oxidized at the expense of another which suffers reduction. This type of reaction is called a disproportionation and this specific aldehyde reaction is known as the Cannizzaro reaction. An illustration of such a reaction is the reaction of benzaldehyde with potassium hydroxide, which yields potassium benzoate and benzyl alcohol.

It has now been found that such aldehydes, i. e., those aromatic aldehydes having no alpha hydrogen atoms, may be condensed in the presence of free radicals at moderately elevated temperatures to produce glycol diesters. This new reaction is preferably conducted in the absence of a base so that, although it is related to the Cannizzaro reaction, it is distinct therefrom.

The glycol diesters which are produced according to this invention are valuable as parasiticides and particularly as miticides. They may also be used as intermediates for the manufacture of still other compounds. It is the object of the present invention to produce such esters by a novel efficient and economical process.

The present invention is applicable to all aromatic aldehydes. By the term "aromatic aldehydes" is meant those aldehydes in which the aldehyde group is bonded directly to an aromatic nucleus. Such aromatic aldehydes may or may not contain other substituent groups. Although it is preferred to use a single aldehyde, mixtures of aldehydes may be employed. Typical of the non-substituted aldehydes are benzaldehyde, o-, m- or p-tolualdehyde, 2,4; 2,5; 3,4- or 3,5-dimethyl benzaldehyde, 2,4,6-trimethyl benzaldehyde, 2,4-dimethyl-6-tert-butyl-benzaldehyde, cuminaldehyde (p-isopropylbenzaldehyde), β-naphthaldehyde and anisaldehyde. As is pointed out above, the invention is also applicable to substituted aldehydes. Such aldehydes may contain substituent groups such as hydroxy, halogen, nitroso, nitro, amino, methoxy, and include aldehydes such as the following: salicylaldehyde, 6-chlor-2-bromobenzaldehyde, parabromobenzaldehyde, 2,4,6-trichlorobenzaldehyde, 3,4-dichlorobenzaldehyde, para-nitrosobenzaldehyde, 2-nitrobenzaldehyde, 5-nitro-2,4-dimethyl-6-tert butyl benzaldehyde, o- or p-aminobenzaldehyde, m-hydroxybenzaldehyde, o-methoxybenzaldehyde, p-N-dimethyl-aminobenzaldehyde, 2-hydroxy-3,5,6-trimethylbenzaldehyde, and piperonal.

The above list of typical aldehydes is given for purposes of illustration and the invention is not limited to the specific compounds set forth.

As a source of free radicals, it is preferred to use the organic peroxides. Suitable peroxides include dimethyl peroxide, methyl ethyl peroxide, propyl butyl peroxide, dipropyl peroxide, diisopropyl peroxide, diacetyl peroxide and dibenzoyl peroxide. An even more preferred sub-group of the diperoxides are those in which at least one of the carbon atoms which is adjacent to the peroxy groups is a tertiary carbon atom. In other words, at least one carbon atom which is directly linked to the peroxy group is also directly attached to three other carbon atoms. Examples of such tertiary peroxides include methyl tertiary-butyl peroxide, isopropyl tert-butyl peroxide, di-tertiary-butyl peroxide, di-tertiary-amyl peroxide, di-tertiary-hexyl peroxide and tertiary-butyl tertiary-hexyl peroxide. Halogenated peroxides such as mono-chlor-di-tertiary-butyl peroxide and mono-chlor-di-tertiary-amyl peroxide may also be used.

In addition to the peroxides, as mentioned above, the reaction may also be promoted by other sources of free radicals. For instance, substances such as lead tetraethyl may be used which form free radicals under the influence of actinic light. Other substances such as azomethane and ethylene oxide, may be used which produce free radicals at elevated temperatures. Further, it is possible to promote the reaction with actinic light alone, since it has been found that the aldehydes used dissociate to form free radicals under the influence of actinic light. However, because of greater efficiency and more consistent results, it is preferred to operate with the peroxides set forth above.

When peroxides are used to promote the reaction, the reaction is preferably carried out at the decomposition temperature of the peroxide chosen. Normally the reaction temperature will be from about room temperature (20° C.) to about 200° C., and it is preferred to operate at from about 65° C. to about 150° C. The pressure is not critical and may be normal, subatmospheric or superatmospheric. During the reaction a precipitate may be formed and to secure the maximum yield, the reaction is continued until the quantity of precipitate shows no further increase. Ordinarily this may take from a matter of minutes to as much as 75 or more hours. Generally speaking, the higher the temperature, the shorter the reaction time. Likewise, the higher the concentration of the sensitizing agent, such as peroxide, the faster the reaction. As is well known to those skilled in the art, organic peroxides differ greatly in their effectiveness. Hence, as mentioned above, the temperature requirements for the promotion of the reaction by, for example, benzoyl peroxide would be in the range of approximately 65-95° C., while with di-tertiary-butyl peroxide a temperature range would be 110-150° C. In the intermediate temperature range 80-120° C., such a peroxidic compound as 2,2-bis(tertiary-butylperoxy)butane may be used. When thermalsensitizing agents other than organic peroxides are employed for this reaction the temperature conditions must be those at which the sensitizing agent is appreciably decomposed into free radicals. However, when actinic radiations are employed the temperature for conducting the reaction may be around room temperature since the radiation supplies the energy necessary to dissociate the sensitizing agent into free radicals which initiate the reaction.

The reaction may be carried out batch-wise or continuously. Inasmuch as the reaction is ordinarily fairly slow, it is preferred to operate in a batch-wise manner.

The glycol diesters produced according to the present invention are optically active and the meso, dextro and levo forms are all produced. In the case of the reaction product of benzaldehyde, which is sym-diphenylethylene glycol dibenzoate, the meso form precipitates out of the reaction mixture as crystals, while the mixture of d- and l-esters remains in solution in the reaction mixture.

Although this invention is not predicated on any theory of its operation, it is believed that the reaction proceeds as follows in the case of benzaldehyde and di-tertiary-butyl peroxide:

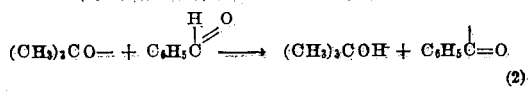
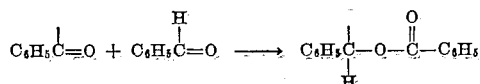
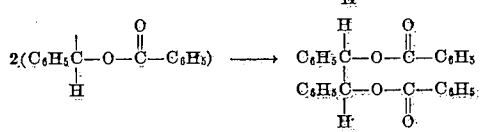

From the foregoing it may be seen that the peroxide (or for that matter, any other sensitizing agent) decomposes to form free radicals (1). These radicals attack the aldehyde removing the aldehydic hydrogen atom forming a free radical of the aldehyde (2), which, in turn, adds to the oxygen atom of another molecule of aldehyde (3). The complex free radical thus formed dimerizes to produce the diester (4).

It may be seen from the above that each mole of peroxide yields two free radicals, which serve to unite four moles of aldehyde. Thus one mole of peroxide (or other source of two free radicals) should be employed for each four moles of aldehyde. However, it is preferred to use slightly less than the stoichiometric quantity of peroxide to lessen the likelihood of competing follow-reactions between the diester product and the diperoxide.

No benzyl benzoate is formed during the above series of reactions and its absence suggests that the ester radical, as produced in the third equation, is incapable of abstracting a hydrogen atom from benzaldehyde, and instead two such radicals eventually combine with remarkable specificity to form the glycol diester. The absence of benzyl benzoate proves that this is not the Cannizzaro reaction.

The following non-limiting examples illustrate the manner in which the invention may be carried out:

*Example I*

200 ml. (2 moles) of benzaldehyde and 50 ml. (0.274 mole) of di-tert-butyl peroxide were placed in a reaction flask equipped with a reflux condenser. The flask was heated to 109° C. and maintained at this temperature for 63 hours. During the reaction 336 ml. (N. T. P.) of gas was evolved (primarily methane) and a copious precipitate of meso-sym-diphenylethylene glycol dibenzoate was formed in the reaction vessel. During the reaction 0.18 mole of di-tertiary-butyl peroxide reacted and there was removed from the reaction flask 0.31 mole of tertiary-butyl alcohol.

*Example II*

The experiment of Example I was repeated, except that the temperature was maintained at 130° C. for 30 hours. During this reaction 475 ml. (N. T. P.) of gas (primarily methane) was evolved and a large quantity of a precipitate was formed. During this reaction 0.20 mole of peroxide reacted and 0.40 mole of tertiary butyl alcohol was recovered. The crystalline precipitate was separated by filtration and washed with hot ethanol. It was identified as the meso form of sym-diphenylethylene glycol dibenzoate by the following determinations:

| | Found | Theory $C_{28}H_{22}O_4$ |
|---|---|---|
| Carbon, per cent weight | 79.5 | 79.6 |
| Hydrogen, per cent weight | 5.3 | 5.2 |
| Saponification equivalent | 212.5 | 211 |
| Melting point, degrees C | 244 | 244 |

The filtrate from the ester crystals was distilled at 1.5–2.0 mm. of mercury and 100° C. to remove all volatile material; this distillation provided the means for determining the amounts of tertiary-butyl alcohol which were formed and peroxide which did not react. There was left a non-volatile rosin-like residue. This had the following analysis, and was a mixture of sym-diphenylethylene glycol dibenzoate stereoisomers.

| | Found | Theory $C_{28}H_{22}O_4$ |
|---|---|---|
| Carbon, per cent weight | 79.2–.3 | 79.6 |
| Hydrogen, per cent weight | 5.3–.3 | 5.2 |
| Molecular weight (ebull.) | 408 | 422 |
| Saponification equivalent | 211 | 211 |

The total yield of the glycol ester was 85% based on the peroxide consumed:

| | Grams | Moles |
|---|---|---|
| di-tertiary-butyl peroxide: | | |
| input | 40 | 0.274 |
| recovered | 10 | 0.068 |
| consumed | 30 | 0.206 |
| diphenylethylene glycol dibenzoate produced | 74 | 0.175 |

In an effort to isolate benzyl alcohol as evidence from benzyl benzoate formation, a saponification reaction mixture of the product was diluted with ether and the precipitated sodium benzoate filtered off. The ester and alcohol were evaporated and the gummy residue heated under vacuum so as to distill any benzyl alcohol which might be present. However, no distillate was obtained and it must be assumed that benzyl benzoate is absent.

*Example III*

106 grams (1.0 mole) of benzaldehyde and 21 grams (0.09 mole) of dibenzoyl peroxide were heated under reflux at 80° C. for about 18 hours, during which time all of the dibenzoyl peroxide reacted. During this time 380 cc. (N. T. P.) of gas was evolved composed of 57.7 mol percent carbon dioxide and 42.3 mol percent carbon monoxide. From the liquid product was isolated 6.0 grams of crystalline meso-diphenyl ethylene glycol dibenzoate.

*Example IV*

In a clear quartz test tube was placed 77.7 grams of benzaldehyde. The tube was irradiated for 89 hours with light from a 100 watt mercury vapor arc lamp having a quartz envelope. During exposure to the light the liquid became light yellow. The unreacted benzaldehyde was removed by distillation leaving a residue of about 10 grams of a brown, rosin-like material. This material had a saponification equivalent of 270 and closely resembled the material formed from benzaldehyde in the presence of peroxides.

We claim as our invention:

1. A process for the production of glycol diesters which comprises, heating for not more than 100 hours at a temperature of from 20° C. to 200° C., an aromatic aldehyde, in which the aldehyde group is attached to an aromatic ring, in contact with a source of free radicals from the group consisting of actinic light and organic peroxides.

2. A process for the production of glycol diesters which comprises, heating for not more than 100 hours at a temperature of from 20° C. to 200° C., an aromatic aldehyde, in which the aldehyde group is attached to the ring of a hydrocarbon of the benzene series, in the presence of an organic peroxide, having a decomposition temperature between 20° C. and 200° C., at about the decomposition temperature of the peroxide.

3. The process of claim 2 in which the peroxide is dibenzoyl peroxide.

4. The process of claim 2 in which the peroxide is di-tertiary-butyl peroxide.

5. A process for the production of glycol diesters which comprises, heating for not more than 100 hours at a temperature of from 20° C. to 200° C., an aromatic aldehyde, in which the aldehyde group is attached to the ring of a hydrocarbon of the benzene series, while irradiating the aldehyde with actinic light consisting essentially of radiation below 3200 Angstrom units.

6. A process for the production of sym-diphenylethylene glycol dibenzoate, which comprises, heating benzaldehyde, for a period of not more than 100 hours, to a temperature of from 20° C. to 200° C., while irradiating the aldehyde with actinic light consisting essentially of radiation below 3200 Angstrom units.

7. A process for the production of sym-diphenylethylene glycol dibenzoate which comprises heating benzaldehyde to a temperature between 75° C. and 150° C. in the presence of free radicals produced from the dissociation of di-tertiary-butyl peroxide.

8. A process for the production of sym-diphenylethylene glycol dibenzoate which comprises heating benzaldehyde to a temperature between 75° C. and 150° C. in the presence of free radicals produced from the dissociation of dibenzoyl peroxide.

FREDERICK F. RUST.
WILLIAM E. VAUGHAN.
FRANK H. SEUBOLD.

REFERENCES CITED

The following references are of record in the file of this patent:

FOREIGN PATENTS

| Number | Country | Date |
|---|---|---|
| 808,897 | France | Feb. 17, 1937 |

OTHER REFERENCES

Silber et al., "Ber. der. Deut. Chem.," vol. 34 (1901), pp. 1538–1539.

Silber et al., "Ber. der. Deut. Chem.," vol. 36 (1903), pp. 1575–1576.